United States Patent [19]

Forsgren

[11] Patent Number: 5,222,488
[45] Date of Patent: Jun. 29, 1993

[54] RESPIRATOR AIR FILTER CARTRIDGE WITH A REPLACEABLE FILTER ELEMENT

[75] Inventor: R. D. Forsgren, Minneapolis, Minn.

[73] Assignee: Donaldson Company, Inc., Minneapolis, Minn.

[21] Appl. No.: 728,699

[22] Filed: Jul. 11, 1991

[51] Int. Cl.⁵ .................... A62B 19/00; A62B 23/02; B01D 46/52; B01D 27/00
[52] U.S. Cl. .................. 128/201.25; 128/206.17; 55/497; 55/502; 55/504; 55/521; 55/DIG. 35; 210/450; 210/451; 210/446
[58] Field of Search .............. 128/201.25, 201.27, 128/201.28, 201.29, 206.12, 206.13, 207.12, 206.14, 206.15, 206.16, 206.17; 55/497, 498, 499, 502, 503, 504, 521, DIG. 33, DIG. 35; 210/437, 446, 450, 451, 454

[56] References Cited

U.S. PATENT DOCUMENTS

| | | |
|---|---|---|
| 2,269,461 | 1/1942 | Lehmberg . |
| 2,652,828 | 9/1953 | Matheson .................. 128/206.15 X |
| 2,744,523 | 5/1956 | Malcom et al. ................ 55/503 X |
| 2,744,525 | 5/1956 | Whipple .................... 55/DIG. 35 |
| 2,798,483 | 7/1957 | Kashima . |
| 3,161,491 | 12/1964 | Gongoll et al. ................. 55/502 |
| 3,167,416 | 1/1965 | Humbert et al. ............... 55/498 |
| 3,296,781 | 1/1967 | Schumann .................... 55/497 |
| 3,796,027 | 3/1974 | Gumton .................... 55/504 X |
| 3,800,510 | 4/1974 | Lamond .................. 55/497 X |
| 3,944,403 | 3/1976 | Simpson et al. ................ 55/316 |
| 4,148,732 | 4/1979 | Burrow et al. ................ 55/503 X |
| 4,154,586 | 5/1979 | Jones et al. ............... 55/DIG. 33 X |
| 4,179,274 | 12/1979 | Moon ................... 55/DIG 33 X |
| 4,207,882 | 6/1980 | Lemere ................... 128/206.12 |
| 4,304,230 | 12/1981 | Seufert .................. 128/206.12 X |
| 4,543,112 | 9/1985 | Ackley et al. ............. 128/206.15 X |
| 4,548,626 | 10/1985 | Ackley et al. ............. 128/206.17 X |
| 4,549,543 | 10/1985 | Moon .................... 128/206.12 |
| 4,573,464 | 3/1986 | Yo ....................... 128/206.15 |
| 4,614,186 | 7/1986 | John ..................... 128/201.25 |
| 4,686,976 | 8/1987 | Bakkila et al. ............ 128/206.17 X |
| 4,688,567 | 8/1987 | Kikuchi et al. ............ 128/206.15 |
| 4,714,486 | 12/1987 | Silverthorn .............. 128/206.17 X |
| 5,022,900 | 6/1991 | Bar-Yona et al. ................ 55/316 |
| 5,022,901 | 6/1991 | Meunier ...................... 55/316 |

FOREIGN PATENT DOCUMENTS 8606643 11/1986 European Pat. Off. ....... 128/205.12

Primary Examiner—V. Millin
Assistant Examiner—Sebastiano Passaniti
Attorney, Agent, or Firm—Merchant, Gould, Smith, Edell, Welter & Schmidt

[57] ABSTRACT

A respirator cartridge having a housing, a replaceable filter and a cover is provided. The cartridge is sealed by a lip on the filter frame and sealing rings on the housing and cover. The cover is releasably connected to the housing by protuberances on the cover which slide along ramp-up lock devices on the housing when the cover is turned, compressing the filter frame and sealing the cartridge.

17 Claims, 3 Drawing Sheets

RESPIRATOR AIR FILTER CARTRIDGE WITH A REPLACEABLE FILTER ELEMENT

FIELD OF THE INVENTION

This invention relates generally to air filter cartridges used in respirators for protection against toxic agents. More particularly, this invention relates to a cartridge with a replaceable filter element.

BACKGROUND OF THE INVENTION

Various types of air filter cartridges are used in respirators for filtration and removal of particulates and/or gases and vapors from the air. Current filtration devices are permanently encased in a metal or plastic shell/frame. This insures that there is no leakage between the filter and frame. When the filter reaches its loading capacity, the entire cartridge is discarded, including the shell. In many applications, such as high asbestos environments, these cartridges must be replaced frequently. The waste involved has prompted a need for a lower cost alternative to throw-away respirator cartridges.

The filter elements in throw-away filter cartridges are permanently sealed to the frame during manufacturing, under rigidly controlled conditions. A cartridge with a replaceable filter, however, must be designed so that the user can manually assemble the cartridge to create a positive, safe and reliable air-tight seal. Such a cartridge must also allow for easy filter replacement, must not be bulky, and must be cost effective.

The present invention is concerned with a solution to these problems.

SUMMARY OF THE INVENTION

According to the present invention, an air filter cartridge for use on a respirator is provided, comprising a housing, a replaceable filter disposed in the housing, and a cover which seals the filter when the cover is releasably connected to the housing.

The preferred means of sealing the cartridge is by use of a sealing lip on the filter frame and concentric sealing rings on the sealing surfaces of the cover and housing and on the filter support surface. When the cover is connected to the housing the sealing lip is compressed between the sealing surfaces and, on the opposite end of the filter frame, the frame is compressed against the filter support surface, providing a redundant sealing location.

A filter frame spin molded from a resilient plastic material softer than the housing and cover is preferred. This allows the filter frame to be deformed when the cover compresses the filter, providing gasketing and sealing in conjunction with the sealing rings. The filter frame is preferably molded from polyurethane with a durometer of less than 50 Shore A hardness. The housing and cover are preferably made of injection-molded plastic.

The preferred means of connecting the cover to the housing is by use of ramp-up lock devices on the outside of the housing and protuberances on the inside of the cover. The protuberances lock into the ramp-up devices when the cover is extended over the housing and turned, compressing and sealing the filter. The locked position preferably provides a positive mechanical and/or visual indication that the filter frame is sufficiently compressed to cause gasketing and sealing.

This allows for easy filter replacement and for a positive, safe and reliable air-tight seal. By making the housing and cover reusable and replacing only the filter when the filter reaches its loading capacity, component cost, inventory cost, and shipping cost are reduced. The cost to the environment is also reduced because of reduced need for raw materials, processing, manufacturing, and eventual waste disposal.

These and other advantages and features of novelty which characterize the invention are pointed out with particularity in the claims annexed hereto, and forming a part hereof. However, for a better understanding of the invention and its advantages, reference should be had to the drawings which form a further part hereof and to the accompanying descriptive matter in which there is illustrated and described a preferred embodiment of the invention.

DETAILED DESCRIPTION OF THE INVENTION

Figure 1:
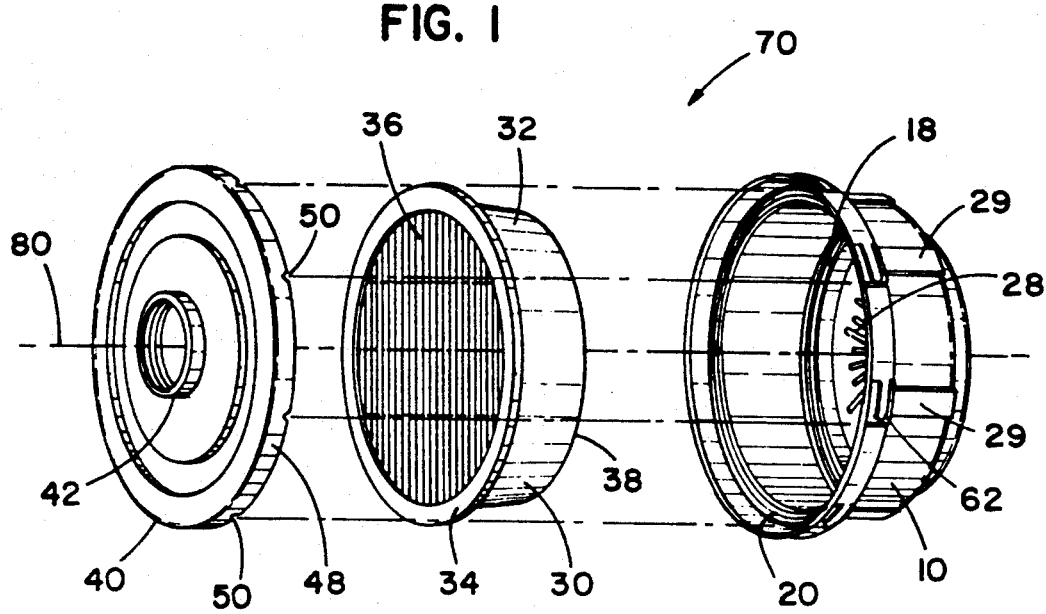
FIG. 1 is an exploded perspective view of a respirator cartridge including a housing, a filter, and a cover according to the present invention.
Figure 2:
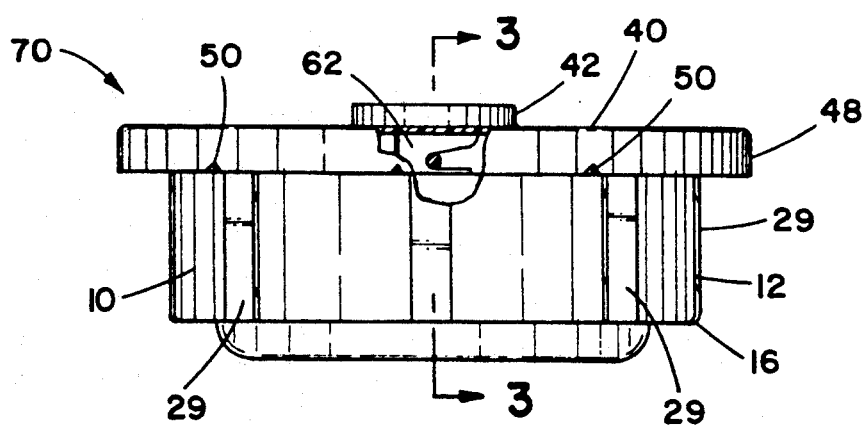
FIG. 2 is a side view of the respirator cartridge shown in FIG. 1 when assembled.
Figure 3:
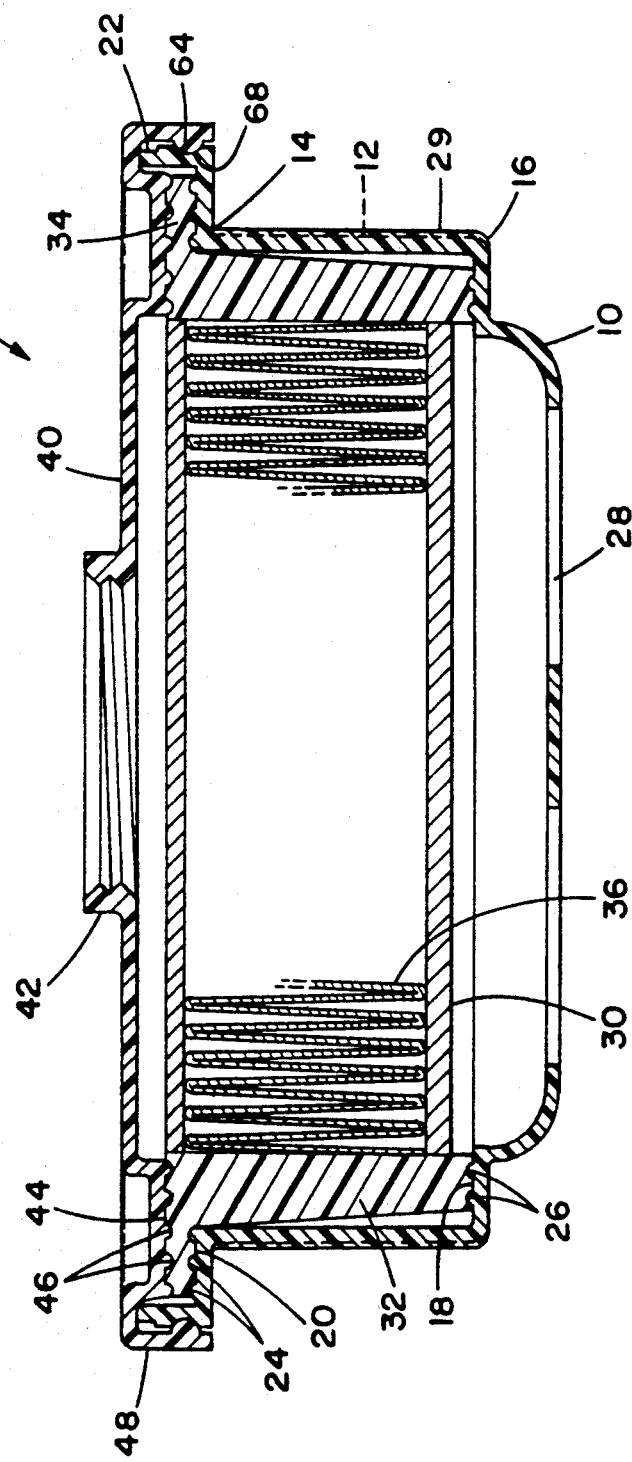
FIG. 3 is a cross-sectional view of the respirator cartridge shown in FIG. 2 taken generally along the line 3—3 in FIG. 2.

Referring now to the drawings, and particularly to FIGS. 1, 2 and 3, there is illustrated a respirator cartridge 70 consisting of a housing 10, a filter 30, and a cover 40 which are centered on, and aligned along a central axis 80.

Housing 10 has a substantially cylindrical shape with an annular peripheral wall 12, an upper edge 14, a lower edge 16, a base with a peripheral filter support surface 18, a peripheral sealing surface 20 extending outwardly from upper edge 14, and a second annular peripheral wall 22 extending upwardly from an outer edge of sealing surface 20.

A respirator latch 42, filter element 36, and a vented opening 28 on the opposite end of cartridge 70 form an air passage through cartridge 70. Although, functionally, respirator latch 42 could be located on either end of cartridge, it is located on cover 40 and vented opening 28 is located on the bottom of housing 10 in the preferred embodiment. This minimizes the chance of cartridge 70 being stricken by an object and allows for better visibility.

Replaceable filter 30 has a filter element 36 molded into an annular peripheral frame 32 with a sealing lip 34 extending outwardly from one end. When filter 30 is disposed in housing 10, sealing lip 34 rests on sealing surface 20 of housing and bottom of filter frame 38 rests on filter support surface 18. The distance between bottom of filter frame 38 and bottom of sealing lip 34 is the same as the distance between filter support surface 18 and sealing surface 20 of housing. Filter frame 32 diameter at bottom of sealing lip 34 is the same as the inner diameter of annular peripheral wall 12, but tapers to a smaller diameter at bottom of filter frame 38 to facilitate insertion and removal of filter 30.

When cartridge is assembled, cover 40 extends over housing 10 and filter 30. A peripheral sealing surface 44 of cover is disposed against sealing lip 34 of filter frame and an outer peripheral wall 48 is disposed outwardly of and adjacent to annular peripheral wall 22 of housing. Respirator latch 42 is located on cover 40 although, as stated earlier, it could be located on the other end of cartridge 70, depending upon the overall design of the cartridge.

Means for sealing cartridge 70 are provided by filter frame 32 and concentric sealing rings 24,26,46 on sealing surfaces 20,44 and on filter support surface 18. Filter 30 is first sealed by a series of concentric sealing rings 24,46 on sealing surfaces 20,44 providing repetitive gasketing and sealing when sealing lip 34 is compressed between sealing surfaces 20,44. Sealing rings on housing 24 correspond to sealing rings on cover 46 to provide localized pressure which concentrates force over a smaller area, enhancing the seal integrity. An additional sealing location is provided by concentric sealing rings 26 on filter support surface 18 when bottom of filter frame 38 is compressed against filter support surface 18.

Filter frame 32 is preferably spin molded from a resilient plastic material of such a durometer that it can be deformed to provide for gasketing and sealing. In the preferred embodiment, filter frame 32 is molded from polyurethane with a durometer of less than 50 Shore A hardness. Housing 10 and cover 40 are made of injection-molded plastic sufficiently hard t deform filter frame 32 when cover 40 is releasably connected to housing 10.

Figure 4:
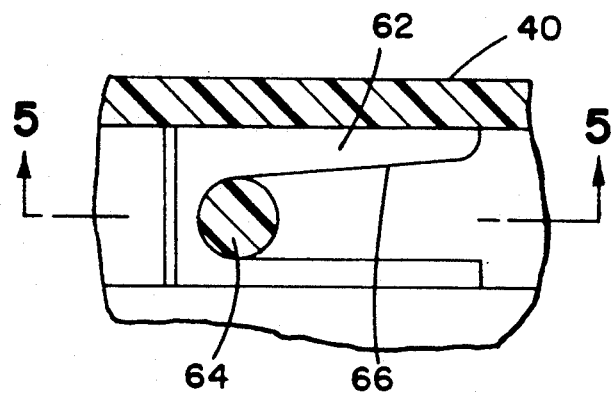
FIG. 4 is an enlarged fragmentary detail view of the locking means in the locked position as shown in FIG. 2.
Figure 5:
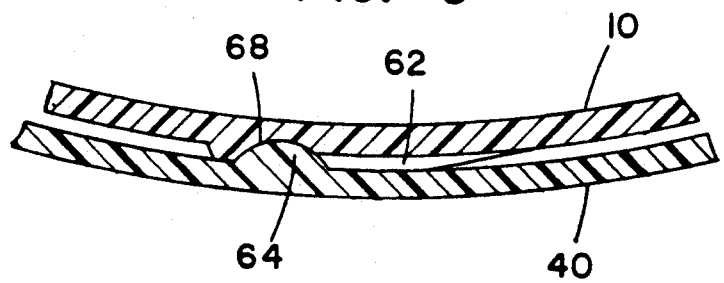
FIG. 5 is a cross-section of a locking means in the locked position taken generally along the line 5—5 in FIG. 4.
Figure 5A:
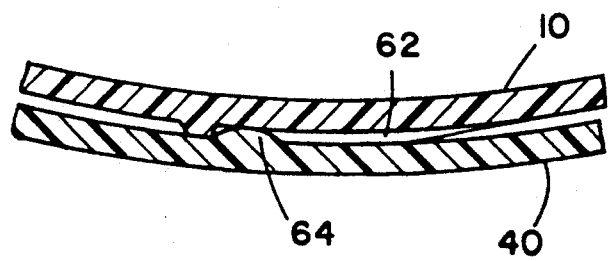
FIG. 5A is a cross-section of a different locking means in the locked position.

Means for releasably connecting cover 40 to housing 10 are provided by locking means, best shown in FIGS. 4 and 5, which compress filter frame 32 to cause gasketing and sealing when in a locked position. The preferred embodiment employs a locking means having a plurality of ramp-up lock devices 62 on an outside surface of second annular peripheral wall 22 of housing 10 and a like number of protuberances 64 on an inside surface of outer peripheral wall 48 of cover 40. Grip enhancers 29 are employed on housing 10 to aid the user in connecting and removing cover 40. When cover 40 is extended over housing 10 and turned, protuberances 64 slide along inclined ramps 66, compressing filter frame 32, and locking in place into a recessed detent 68. This provides a positive indication of when filter frame 32 is sufficiently compressed to provide adequate gasketing and sealing. The locked position also provides resistance sufficient to prevent accidental opening. The preferred embodiment also includes visual indicators 50, which are v-shaped notches that line up with upper edge of ramp-up lock devices 62 when cover 40 is locked, to provide for easy and fail-safe assembly. In the preferred embodiment, six of eight ramp-up lock devices 62 have a recessed detent 68 into which protuberances lock, as shown in FIG. 5, while remaining two, located opposite each other, do not, as shown in FIG. 5A. This allows the exterior of housing 10 to be de-molded in a single-axis pull. When filter element 36 has reached its loading capacity, cartridge 70 can easily be disassembled by turning cover 40 in the opposite direction.

It is to be understood, however, that even though numerous advantages and characteristics of the invention have been set forth in the foregoing description, together with details of the structure and function of the invention, the disclosure is illustrative only, and changes may be made in detail, especially in matters of shape, size, arrangement of parts, and material of components within the principles of the invention, to the full extent indicated by the broad general meanings of the terms in which the appended claims are expressed.

What is claimed is:

1. A filter cartridge for use on a respirator, having a replaceable filter, comprising:
   (a) a housing having an annular peripheral wall with upper and lower edges, a base with a peripheral filter support surface extending inwardly from said lower edge, a peripheral sealing surface extending radially outwardly from said upper edge, and a second annular peripheral wall extending upwardly from an outer edge of said peripheral sealing surface;
   (b) a replaceable filter member comprising a filter element and an annular peripheral frame having a compressible sealing lip extending outwardly from one end thereof, said filter member being disposed in said housing, with an opposite end of said frame resting on said filter support surface, and with said sealing lip resting on said peripheral sealing surface of said housing;
   (c) a cover member extending over said housing and filter member, having a peripheral sealing surface disposed against said sealing lip and an outer peripheral wall disposed adjacent said second annular peripheral wall of said housing;
   (d) said filter support surface and said peripheral sealing surfaces of said housing and said cover member having at least one sealing ring disposed to engage said filter frame; and
   (e) means for releasably connecting said cover to said housing to compress said filter frame between said peripheral sealing surfaces of said housing and said cover member and against said filter support surface.

2. The filter cartridge of claim 1 wherein said filter frame is spin molded from a resilient plastic material of such durometer that it can be deformed to provide for gasketing and sealing with said sealing rings when said cover member is releasably connected to said housing.

3. The filter cartridge of claim 2 wherein said filter frame is made of polyurethane having a durometer of less than 50 Shore A hardness.

4. The filter cartridge of claim 1 wherein said housing and cover are made of injection-molded plastic sufficiently hard to deform said filter frame to provide for gasketing and sealing with said filter frame when said cover is releasably connected to said housing.

5. The filter cartridge of claim 1 wherein said means for releasably connecting said cover member to said housing comprise releasable locking means, movable between released and locked positions, which compress said filter frame to cause gasketing and sealing when in said locked position.

6. The filter cartridge of claim 1 wherein each of said filter support surface and said sealing surfaces of said housing and said cover member have a plurality of concentric rings disposed to engage said filter frame.

7. A filter cartridge for a respirator, comprising:
   (a) a housing having a base with an air passage, a peripheral filter support surface, and a peripheral sealing surface spaced therefrom;

(b) a replaceable filter member comprising a filter element and a peripheral frame having a sealing lip extending outwardly therefrom, said filter member being disposed in said housing, with said frame resting on said filter support surface, and with said sealing lip resting on said peripheral sealing surface;

(c) a cover member having an air passage and a peripheral sealing surface disposed against said sealing lip;

(d) sealing means between said filter support surface and said filter frame, and between said peripheral sealing surfaces of said housing and said cover member and said filter frame; and (e) means for releasably connecting said cover to said housing to compress said filter frame between said peripheral sealing surfaces of said housing and said cover member and against said filter support surface.

8. The filter cartridge of claim 7 wherein said sealing means comprise integral sealing rings; and wherein either said cover and housing or said filter frame carry said rings and is of different hardness than the other to allow for gasketing and sealing when said cover is releasably connected to said housing.

9. The filter cartridge of claim 8 wherein said sealing means comprises a plurality of concentric sealing rings formed as a part of said housing and cover and disposed to engage said filter frame.

10. The filter cartridge of claim 9 wherein said filter frame is spin molded from a resilient plastic material of such durometer that it can be deformed to provide for gasketing and sealing with said sealing rings when said cover is releasably connected to said housing.

11. The filter cartridge of claim 10 wherein said filter frame is made of polyurethane having a durometer of less than 50 Shore A hardness.

12. The filter cartridge of claim 0 wherein said housing and cover are made of injection-molded plastic sufficiently hard to deform said filter frame to provide for gasketing and sealing with said filter frame when said cover member is releasably connected to said housing.

13. The filter cartridge of claim 7 wherein said housing has an annular peripheral wall with upper and lower edges, said peripheral filter support surface extends inwardly from said lower edge, said peripheral sealing surface extends outwardly from said upper edge, and said housing has a second annular peripheral wall extending upwardly from an outer edge of said peripheral sealing surface; wherein said cover extends over said housing and filter, and has an outer peripheral wall disposed adjacent said second annular peripheral wall of said housing; and wherein said means for releasably connecting said cover to said housing comprise releasable locking means, movable between released and locked positions, which compress said filter frame to cause gasketing and sealing when in said locked position.

14. A filter cartridge for a respirator according to claim 7 wherein one of said sealing lip and said peripheral sealing surfaces of said housing and said cover member is compressible.

15. A filter cartridge for use on a respirator, having a replaceable filter, comprising:

(a) a housing having an annular peripheral wall with upper and lower edges, a base with a peripheral filter support surface extending inwardly from said lower edge, a peripheral sealing surface extending outwardly from said upper edge, and a second annular peripheral wall extending upwardly from an outer edge of said peripheral sealing surface;

(b) a replaceable filter member comprising a filter element and an annular peripheral frame having a sealing lip extending outwardly from one end thereof, said filter member being disposed in said housing, with an opposite end of said frame resting on said filter support surface, and with said sealing lip resting on said peripheral sealing surface of said housing;

(c) a cover member extending over said housing and filter member, having a peripheral sealing surface disposed against said sealing lip and an outer peripheral wall disposed adjacent said second annular peripheral wall of said housing;

(d) said filter support surface and said peripheral sealing surfaces of said housing and said cover member having at least one sealing ring disposed to engage said filter frame; and (e) means for releasably connecting said cover member to said housing to compress said filter frame between said peripheral sealing surfaces of said housing and said cover member and against said filter support surface, said means for releasably connecting said cover member to said housing including releasable locking means, movable between released and locked positions, which compress said filter frame to cause gasketing and sealing when in said locked position, said releasable locking means including:

(i) a plurality of ramp-up lock devices on an outside surface of said second annular peripheral wall of said housing;

(ii) a plurality of protuberances on an inside surface of said outer peripheral wall of said cover;

(iii) said protuberances sliding along an inclined ramp on said ramp-up lock devices to compress said filter frame when said cover is extended over said housing and turned;

(iv) said protuberances locking into said ramp-up lock devices when said cover is further turned;

(v) said locked position providing a positive indication of when said filter frame is compressed sufficiently to provide adequate gasketing and sealing; and (vi) said locked position providing resistance sufficient to prevent accidental opening.

16. A filter cartridge for a respirator, comprising:

(a) a housing having an annular peripheral wall with upper and lower edges, a base with an air passage, a peripheral filter support surface extending inwardly from said lower edge, and a peripheral sealing surface spaced therefrom and extending outwardly from said upper edge, and a second annular peripheral wall extending upwardly from an outer edge of said peripheral sealing surface;

(b) a replaceable filter member comprising a filter element and a peripheral frame having a sealing lip extending outwardly therefrom, said filter member being disposed in said housing, with said frame resting on said filter support surface, and with said sealing lip resting on said peripheral sealing surface;

(c) a cover member having an air passage and extending over said housing and filter, and having a peripheral sealing surface disposed against said sealing lip and an outer peripheral wall disposed adjacent said second annular peripheral wall of said housing;

(d) sealing means between said filter support surface and said filter frame, and between said peripheral sealing surfaces of said housing and said cover member and said filter frame; and (e) means for releasably connecting said cover member to said housing to compress said filter frame between said peripheral sealing surfaces of said housing and said cover member and against said filter support surface, said connecting means including releasable locking means, movable between released and locked positions, which compress said filter frame to cause gasketing and sealing when in said locked position, said locking means including:
  (i) a plurality of ramp-up lock devices on an outside surface of said second annular peripheral wall of said housing;
  (ii) a plurality of protuberances on an inside surface of said outer peripheral wall of said cover;
  (iii) said protuberances sliding along an inclined ramp on said ramp-up lock devices to compress said filter frame when said cover is extended over said housing and turned;
  (iv) said protuberances locking into said ramp-up lock devices when said cover is further turned;
  (v) said locked position providing a positive indication of when said filter frame is compressed sufficiently to provide adequate gasketing and sealing; and
  (vi) said locked position providing resistance sufficient to prevent accidental opening.

17. A filter cartridge for use on a respirator, having a replaceable filter, comprising:

(a) a housing having an annular peripheral wall with upper and lower edges, a base with a peripheral filter support surface extending inwardly from said lower edge, a peripheral sealing surface extending outwardly from said upper edge, and a second annular peripheral wall extending upwardly from an outer edge of said peripheral sealing surface;

(b) a replaceable filter member comprising a filter element and an annular peripheral frame having a sealing lip extending outwardly from one end thereof, said filter member being disposed in said housing, with an opposite end of said frame resting on said filter support surface and with said sealing lip resting on said peripheral sealing surface of said housing;

(c) a cover member extending over said housing and filter member, having a peripheral sealing surface disposed against said sealing lip and an outer peripheral wall disposed adjacent said second annular peripheral wall of said housing;

(d) said filter support surface and said peripheral sealing surfaces of said housing and said cover member having at least one sealing ring disposed to engage said filter frame; and (e) means for releasably connecting said cover to said housing to compress said filter frame between said peripheral sealing surfaces of said housing and said cover member and against said filter support surface; said means for releasably connecting said cover member to said housing including releasable locking means, movable between released and locked positions, which compress said filter frame to cause gasketing and sealing when in said locked position; said releasable locking means including:
  (i) a plurality of ramp-up lock devices on an outside surface of said second annular peripheral wall of said housing;
  (ii) a plurality of protuberances on an inside surface of said outer peripheral wall of said cover;
  (iii) said protuberances sliding along an inclined ramp on said ramp-up lock devices to compress said filter frame when said cover is extended over said housing and turned;
  (iv) said protuberances locking into said ramp-up lock devices when said cover is further turned;
  (v) said locked position providing a positive indication of when said filter frame is compressed sufficiently to provide adequate gasketing and sealing; said positive indication of locked position being provided by a recessed detente on said ramp-up lock device and by a visual indication on said cover and said housing; and
  (vi) said locked position providing resistance sufficient to prevent accidental opening.

* * * * *

UNITED STATES PATENT AND TRADEMARK OFFICE
CERTIFICATE OF CORRECTION

PATENT NO. : 5,222,488
DATED : June 29, 1993
INVENTOR(S) : R.D. Forsgren

It is certified that error appears in the above-indentified patent and that said Letters Patent is hereby corrected as shown below:

Column 3, line 32, "t" should read --to--.

Column 5, line 38, "0" should read --10--.

Column 8, line 41, "detente " should read --detent--.

Signed and Sealed this

Tenth Day of May, 1994

Attest:

BRUCE LEHMAN

Attesting Officer     Commissioner of Patents and Trademarks